United States Patent

[11] 3,590,153

[72] Inventor Yasuo Minowa
Tokyo, Japan
[21] Appl. No. 856,723
[22] Filed Sept. 10, 1969
[45] Patented June 29, 1971
[73] Assignee Nippon Electric Company, Limited
Tokyo, Japan
[32] Priority Sept. 13, 1968
[33] Japan
[31] 43/66445

[54] SOLID-STATE IMAGE SCANNER
1 Claim, 2 Drawing Figs.

[52] U.S. Cl. .......... 178/7.1, 307/311
[51] Int. Cl. .......... H04n 1/04, H03k 3/42
[50] Field of Search .......... 178/7.1, 7.6; 315/169, 169 TV; 307/311; 317/235

[56] References Cited
UNITED STATES PATENTS
3,378,688 4/1968 Kabell .......... 307/311

OTHER REFERENCES
IBM TECHNICAL DISCLOSURE BULLETIN pages 1231 and 1232 Vol. 9 No. 9 Feb. 1967 for " Interlaced Scanistor" by H. van Steenis
IBM TECHNICAL DISCLOSURE BULLETIN page 65 Vol. 7, No. 1, June 1964 for " Pulse Light Generator" by Anderson et al.

*Primary Examiner*—Richard Murray
*Assistant Examiner*—George G. Stellar
*Attorney*—Sandoe, Hopgood and Calimafde

ABSTRACT: A solid-state image scanner comprises a plurality of field effect transistors (FET's) connected in series. A plurality of photodiodes are connected at one of their electrodes to the junctions of the FET's, and their other electrodes are connected in common to a load resistor. A sawtooth scanning voltage is applied to one end of the series-connected FET's. An output video signal is derived across the load resistor through a differentiating circuit.

INVENTOR.
YASUO MINOWA
BY
Sandoe, Hopgood & Calimafde
ATTORNEYS

SOLID-STATE IMAGE SCANNER

This invention relates to a solid state image scanner for image pickup and character recognition.

BACKGROUND OF THE INVENTION

A moving aperture, electron beam, and light beam are the techniques most often employed to perform image scanning. Among these techniques electron beam scanning has been regarded as the most reliable and favorable. However, as a result of the rapid development of integrated circuit techniques, attempts have been made to develop a practical solid-state image scanner. In addition, the development of an optical character recognition system has created a demand for a greatly simplified image-scanning device.

The scanning systems so far proposed for solid-state image pickup devices may be classified into two types. One type is based on the combination of photodiode matrix and tapped delay circuits connected to a pulse source, while the other type comprises a combination of a photodiode array and a bleeder coupled to a scanning sawtooth voltage source. In the former, a great number of active and passive circuit elements are required, with the result that the device is complicated in structure and difficult and costly to manufacture, and has the further undesirable characteristics of insufficient reliability and low useful life.

The solid-state image scanner of the latter type, developed by International Business Machines Corporation, is called the "scanistor." A detailed description of the scanistor is given in Proceedings of the IEEE, Vol. 52, No. 12 (Dec. 1964) at pages 1513 to 1528. Briefly, in the scanistor, the switching diodes interconnected with the photodiodes are forward and reverse biased by the scanning voltage. More specifically, the switching diode of each of the parallel connected photodiode-switching diode pairs is first reverse biased and the sawtooth voltage is then applied to the diode, thereby to sequentially turn the switching diodes into the forward biased state. This results in the sequential turning of the photodiodes into the reverse biased state. During the period of this scanning, the scanning current is subjected to variations depending on the brightness of the elementary images respectively projected on the photodiodes. The scanistor should, however, be formed of a bipolar integrated circuit to be practical as an integrated circuit. A multilayer structure should, therefore, be employed to form the switching diodes and photodiodes within a single substrate. This unavoidably involves difficulties in the actual scanistor manufacturing process.

OBJECT OF THE INVENTION

It is therefore an object of this invention to provide an improved scanistor-type solid-state image scanner which is simple in structure and easy the manufacture.

BRIEF SUMMARY OF THE INVENTION

According to the present invention, there is provided a solid-state image scanner comprising a plurality of field effect transistors (FETs) connected in series. A plurality of photodiodes are connected at one of their electrodes respectively to the junctions of the FETs and are connected at the other of their electrodes in common to a load resistor. A sawtooth scanning voltage is applied to one end of the series connected FETs. The output video signal is derived across the load resistor through a differentiating circuit.

To the accomplishment of the above and to such other objects as may hereinafter appear, the present invention relates to a solid-state image scanner as defined in the appended claim and as described in the following specification taken together with the accompanying drawings in which:

FIG. 1 is a schematic circuit diagram of the image scanner of this invention; and FIGS. 2D, I and V illustrate various waveform diagrams developed in the circuit of FIG. 1.

DETAILED DESCRIPTION OF THE INVENTION

Figure 1:
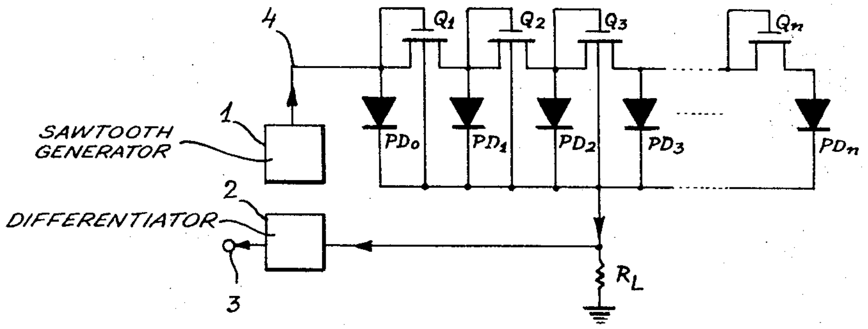

Referring to FIG. 1, a plurality of P-channel metal oxide field effect transistors (MOS-FETs) of enhancement type $Q_1$, $Q_2$, and $Q_n$ have their output drain-source circuits connected in series. The drain and gate electrodes of each FET are connected in common and the source electrode of each FET is connected to the drain electrode of the neighboring FET. The anode electrodes of photodiodes $PD_0$, $PD_1$, and $PD_n$ are respectively connected to the junctions of the transistors and their cathode electrodes connected in common to load means in the form of a load resistor $R_L$.

Figure 2:
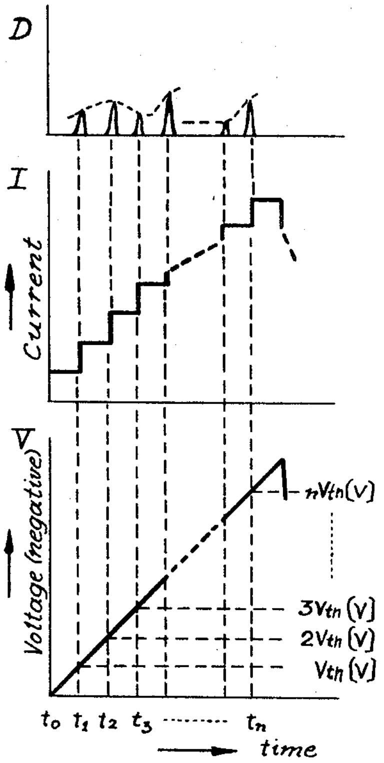

A sawtooth wave generator 1 is coupled to the gate-drain junction of FET $Q_1$ and to the anode terminal of photodiode $PD_0$. As shown in FIG. 2V, the sawtooth wave exhibits a monotonic and linear increase from the time point $t_0$ to $t_n$. More particularly, during the period from time point $t_0$ to $t_1$, the magnitude of the sawtooth wave is sufficiently low to cause photodiode $PD_0$ to be reverse biased. A current is therefore caused to flow through diode $PD_0$ in response to the luminance of an elementary image projected on the diode. The luminance-depending current flow is sensed at the resistor $R_L$ as a voltage change for this period of time and only its variation component is derived at a differentiating circuit 2 connected to resistor $R_L$. Sawtooth generator 1 and differentiator 2 are well-known circuits, the design of which is well within the scope of those skilled in their art. As such, no further description of these circuits is provided herein.

At the time point $t_1$, the scanning voltage exceeds the threshold voltage $V_{th}$ of the first diode $PD_0$, turning the transistor $Q_1$ into the conductive state. In the following time period from $t_1$ to $t_2$, a reverse bias voltage is applied across photodiode $PD_1$ by the sawtooth wave. As a result, the current flowing through the resistor $R_L$ becomes the summation of the current flowing through $PD_0$ diodes and $PD_1$. At the time point $t_2$, the scanning voltage exceeds $2V_{th}$, turning the transistor $Q_2$ into the conductive state. Similarly, as the sawtooth scanning voltage rises with time, transistors $Q_3$, and $Q_n$ are respectively turned conductive at the time points $t_3$ and $t_n$, respectively. To generalize, at the time point $t_n$ when transistor $Q_n$ is turned conductive, the terminal voltages across photodiodes $PD_0$, $PD_1$, and $PD_2$ ... are respectively given by $nV_{th}$, $(n-1)V_{th}$, and $(n-2)V_{th}$. At photodiode $PD_n$ the terminal voltage is practically the contact potential difference and is substantially zero.

As will be seen from the foregoing, the mere application of the sawtooth wave at the terminal 4 of the series-connected FET chain $Q_1$, $Q_2$, ... $Q_n$, results in the photoelectric conversion current as shown in FIG. 2I. The current is derived in the form of voltage across the load resistor $R_L$. The height of each of the steps of the steplike output of the FET chain shown in FIG. 2I represents the luminance of the elementary picture projected on the corresponding one of the photodiodes. Thus, after being subjected to time differentiating at the circuit 2, the video output at terminal 3 has the waveform as shown in FIG. 2D.

The arrangement of FIG. 1 covers only one-dimensional scanning. Based on this scanning principle, however, two-dimensional scanning is easily realizable by combining a plurality of the photodiode arrays arranged side by side, with an appropriate number of delay line circuits for carrying out the horizontal scanning. Since the use of the tapped delay lines is well known among those skilled in the art, this combination will not be detailed any further.

Also, as will be apparent, the circuit components of the present invention are easily incorporated into the form of an integrated circuit. Such measures further facilitate the miniaturization and realization of higher resolution of reproduced pictures.

Thus, while only a single embodiment of the present invention has been herein specifically disclosed, it will be apparent that variations may be made therein within the spirit and scope of the present invention.

What I claim is:

1. A solid-state image scanner device comprising a plurality of field effect transistors, each having source, gate and drain electrodes, said gate and drain electrodes of each of said transistors being connected in common, the source electrode of each of said transistors being connected to the common-coupled gate-drain electrodes of an immediately adjacent transistor; a plurality of photodiodes, each having an anode and a cathode, said anodes being connected respectively to said common-coupled gate-drain electrodes of said transistors; a junction point connected in common to said cathodes, load means connected to said junction point; means for supplying a sawtooth voltage to a first one of said transistors; and means for time differentiating the output signal appearing across said load means, whereby said photodiodes are sequentially put into the luminance-sensing state by the application of said sawtooth scanning pulse thereto.